Figure 3:
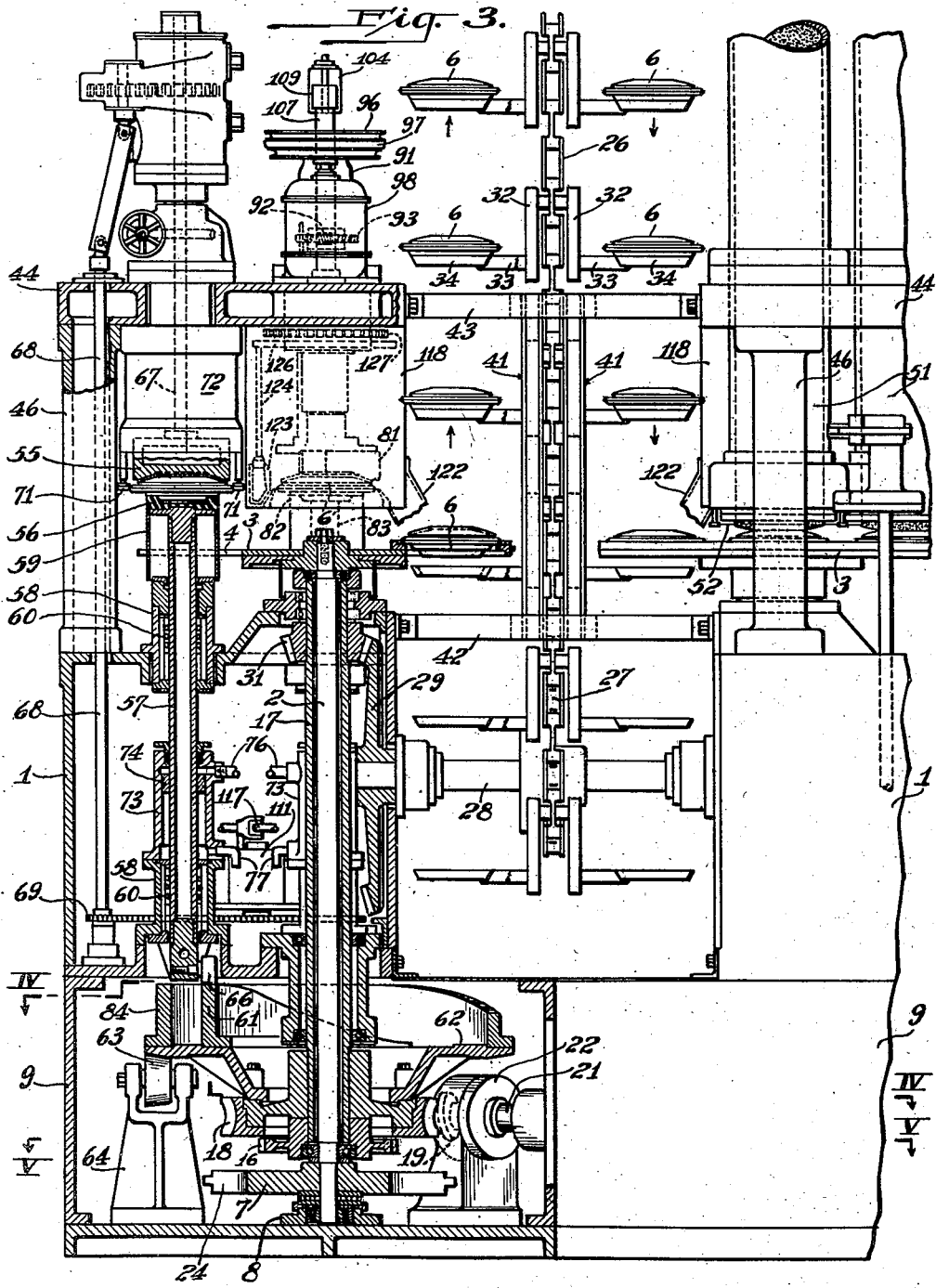

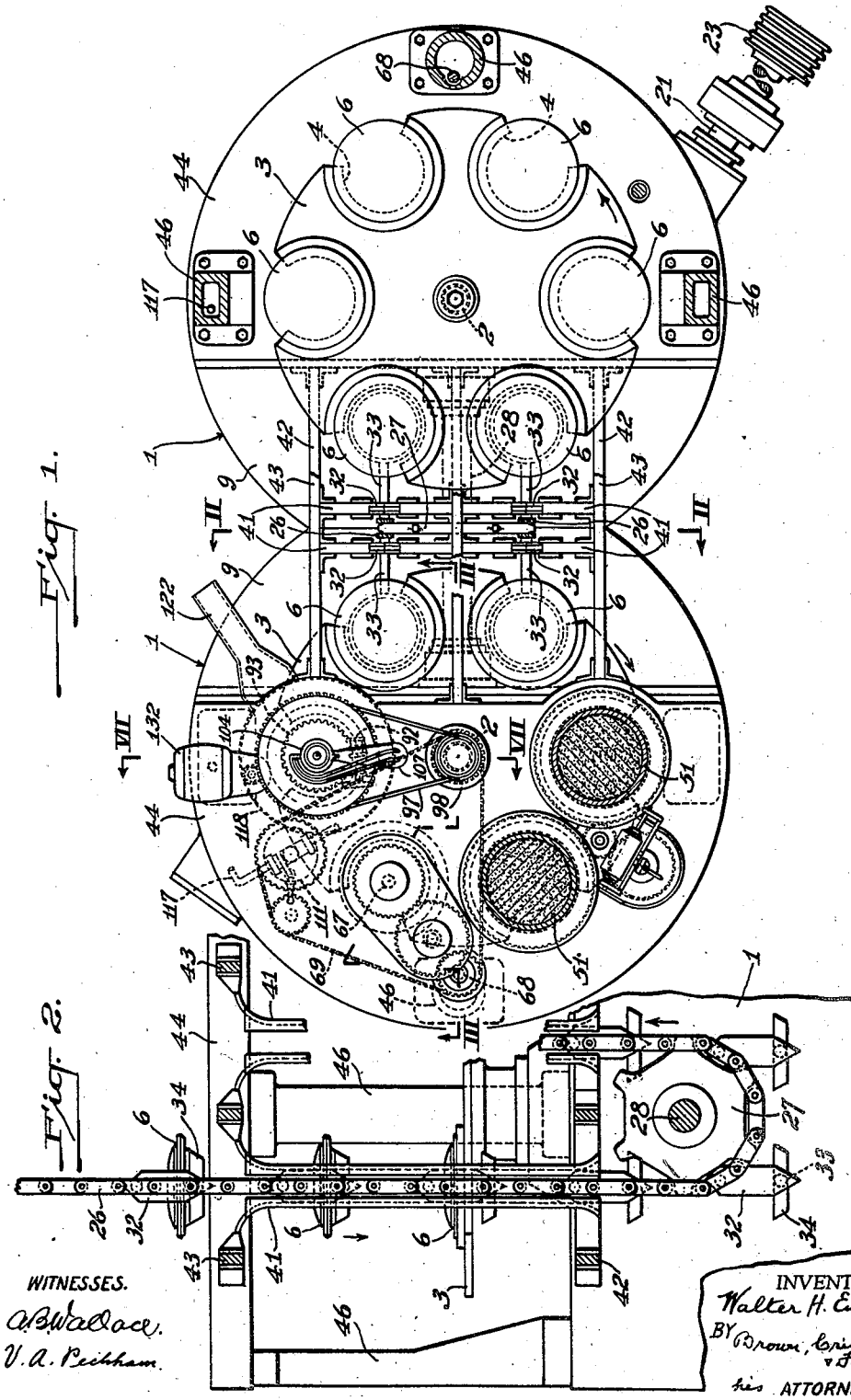

June 8, 1943.    W. H. EMERSON    2,321,471
DINNERWARE MACHINE
Filed April 9, 1940    4 Sheets-Sheet 2

WITNESSES.
O.B. Wallace.
V. A. Peckham.

INVENTOR.
Walter H. Emerson
BY Brown, Critchlow & Flick
his ATTORNEYS.

June 8, 1943.   W. H. EMERSON   2,321,471
DINNERWARE MACHINE
Filed April 9, 1940   4 Sheets-Sheet 3
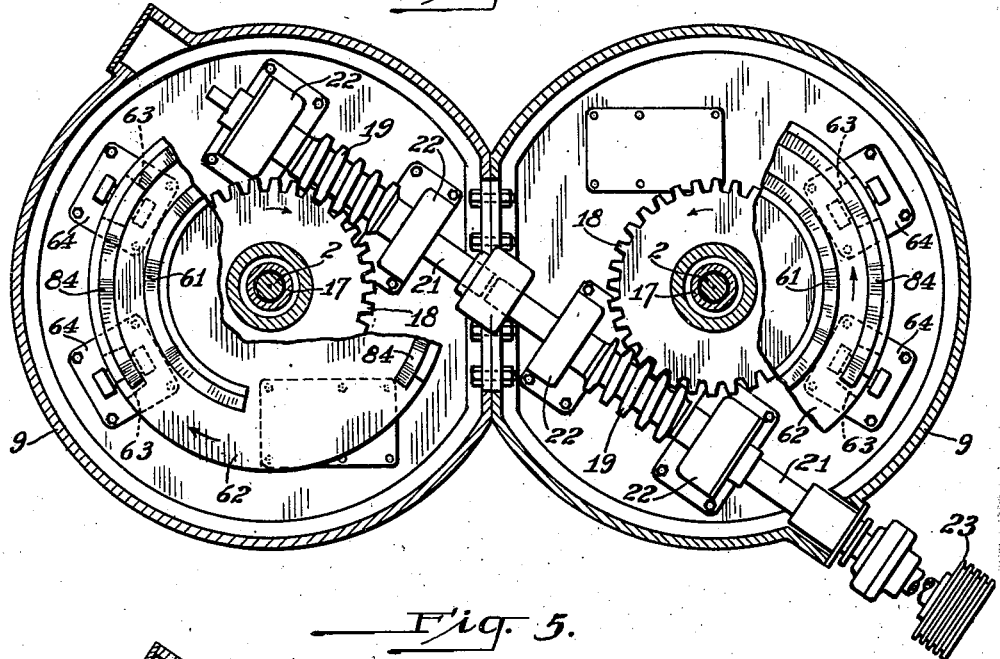
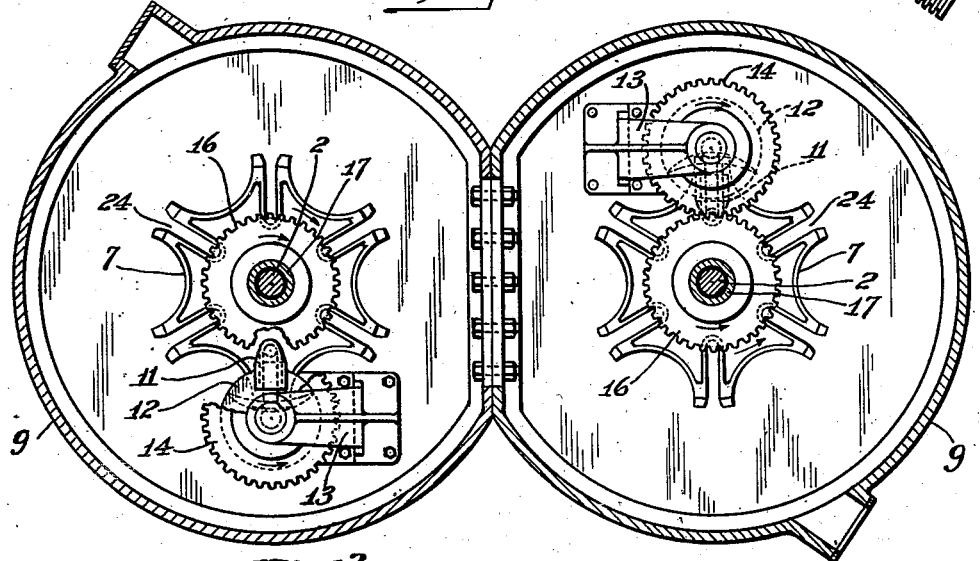

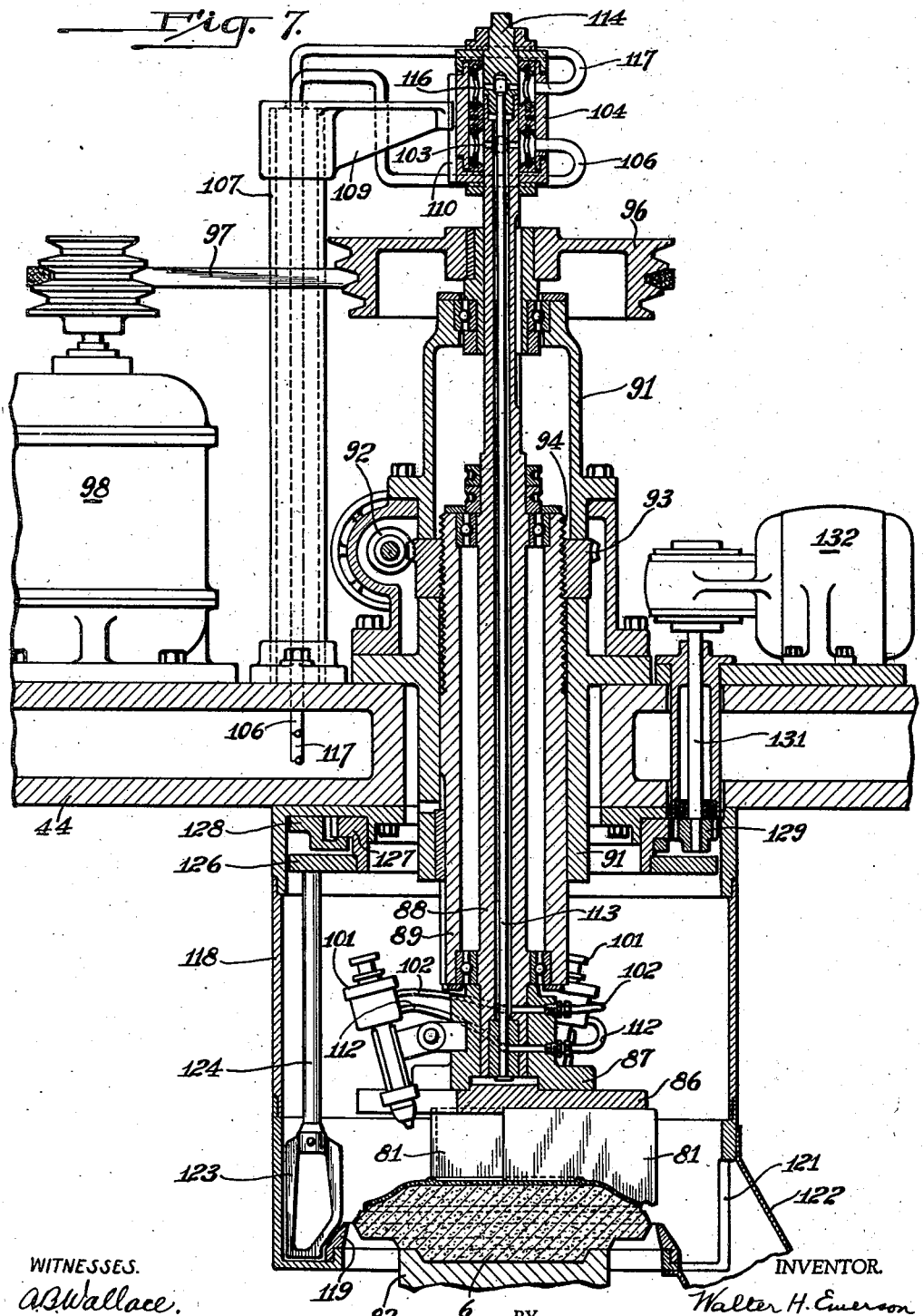

Patented June 8, 1943

2,321,471

UNITED STATES PATENT OFFICE 2,321,471

DINNERWARE MACHINE

Walter H. Emerson, East Liverpool, Ohio, assignor to The Homer Laughlin China Company, Newell, W. Va., a corporation of Delaware Application April 9, 1940, Serial No. 328,638

18 Claims. (Cl. 25—22)

This invention relates to apparatus for automatically manufacturing dinnerware and the like from plastic material, such as moist clay.

It is among the objects of this invention to provide apparatus of this character which is rapid and dependable in operation, which is highly efficient, which manufactures high grade dinnerware and the like of uniform excellence, which greatly decreases the cost of making such articles, which is of relatively simple and compact construction, which is practically noiseless and vibrationless in operation, which requires no manual handling of molds, and to and from which molds are carried by the same conveyor that transports them through a drier.

In accordance with this invention a horizontal support, such as a rotatable table or its equivalent, is provided with spaced recesses extending vertically therethrough for receiving molds on which articles are to be made from plastic material. Means is provided for indexing the support from one station to another at some of which the articles are formed on the molds. Preferably, a blank or bat of plastic material, such as clay, is deposited on a mold at one station, pressed into shape at another, and jiggered at still another station. Empty molds are periodically deposited on the recessed support, and loaded molds removed therefrom by mold-carrying members that are conveyed downwardly through one of the recesses and upwardly through another and then through a drier, after which the finished and dried articles are removed from the molds. The apparatus is entirely automatic in all of its operations, and is fully adjustable so that articles of various shapes and sizes can be manufactured by it.

The preferred embodiment of the invention is illustrated in the accompanying drawings, in which Fig. 1 shows two of my machines joined and working together, the left-hand machine being shown in plan and the right-hand one with its top portion removed; Fig. 2 is a fragmentary view taken on the line II—II of Fig. 1; Fig. 3 is a vertical section through one of the machines taken on the irregular line III—III of Fig. 1, the conveyor being shown in elevation; Figs. 4 and 5 are horizontal sections, partly broken away, taken on the lines IV—IV and V—V, respectively, of Fig. 3, but with the indexing mechanism in Fig. 5 shown in its actuating position; Fig. 6 is a fragmentary view of the indexing mechanism of Fig. 5 in its stationary position; and Fig. 7 is an enlarged vertical section through the jiggering apparatus taken on the line VII—VII of Fig. 1.

Referring to Figs. 1 and 2 of the drawings, my machines are connected together in pairs, each unit thus formed comprising a pair of substantially semi-cylindrical housings 1 mounted with their flat side walls opposite each other in spaced parallel relation. A vertical shaft 2 is journaled in each housing adjacent its flat side wall midway between the ends thereof. Rigidly mounted on the upper end of the shaft is a horizontal table 3 provided around its periphery with six circumferentially spaced arcuate recesses 4 of a size adapted to receive the lower portions of molds 6 on which dinnerware, such as plates and saucers and the like, is made. The shaft is indexed or intermittently rotated by a Geneva mechanism including a spider 7 (Figs. 3, 5 and 6) rigidly mounted on its lower end which is journaled in bearing 8 on the bottom of a sub-housing 9 on which the upper housing 1 is mounted. The two sub-housings of the two adjoining machines are nearly cylindrical with their adjacent flat sides joined together halfway between the two flat inner side walls of the upper housings. The tops of the sub-housings are preferably located at the floor level.

Each Geneva spider is rotated in the usual manner at periodic intervals by means of an arm 11 (Figs. 5 and 6) projecting radially from a horizontal disc 12 which is journaled in a supporting bracket 13 mounted on the bottom of the sub-housing at one side of the spider. The disc is rotated by a gear 14 mounted on its shaft and meshing with a similar gear 16 (Figs. 3 and 5) rigidly mounted on the lower end of a hollow shaft 17 that is rotatably mounted on shaft 2. The hollow shaft is driven by a worm gear 18 thereon (Figs. 3 and 4) from a worm 19 on a horizontal shaft 21 journaled in bearings 22 mounted on the bottom of the sub-housing. As shown in Fig. 4, the two horizontal drive shafts for the two machines are connected end to end and one of them extends through the side wall of its sub-housing and is provided on its outer end with a pulley 23 by which it is driven through belts from an electric motor (not shown). Thus, worm gear 18, hollow shaft 17, and Geneva arm 11 rotate continuously, but the spider and shaft 2 rotate only when the arm enters one of the radial slots 24 in the spider.

Each of the six recesses 4 in each table is indexed to six different circumferentially spaced stations during one revolution of the table, and it is while the recesses are stationary at these stations that the different operations are performed which produce articles of dinnerware on the molds carried by the table. When one of the table recesses is located at the first station, both it and the adjacent recess which is located simultaneously at the last or sixth station, are positioned over the space between the two housings 1, as shown in Fig. 1. When in this position the recess at the first station is adapted to receive a mold on or in which dinnerware is to be formed by the machine, while a mold on or in which dinnerware has been formed at the intervening stations is ready to be removed from the table recess at the sixth station.

To periodically and automatically deposit an empty mold on the table at the first station and remove loaded or ware-carrying molds therefrom at the last station, an endless conveyor is provided. As shown in Figs. 2 and 3, this conveyor comprises an endless chain 26 that extends around and upwardly in parallel vertical strands from a sprocket 27 rigidly mounted midway between housings 1 on a horizontal shaft 28 journaled at its ends in the adjacent flat side walls of the housings. The sprocket shaft is driven from one end by a bevel gear 29 mounted thereon within the adjoining housing and meshing with a bevel pinion 31 rigidly mounted on the upper portion of hollow shaft 17 which, as previously pointed out, is driven continuously. From the ware-forming machine the chain is carried by suitably located sprockets through a drier, such as shown in my copending application, Serial No. 323,542, filed March 12, 1940, in which the ware carried by the molds is dried. Before the dried ware can be carried back to the machines it is removed from the molds manually or by mechanical means, but the molds themselves need never be touched.

As shown in Fig. 3, chain 26 is formed from single straight links pivotally mounted between the ends of double links. Pivotally connected to the central portion of every other single link are the upper ends of a pair of brackets 32 the lower ends of which are provided with arms 33 extending laterally in opposite directions towards the adjacent machines. Rigidly mounted on the outer end of each arm is a horizontal ring 34 in which the lower portion of a mold is adapted to be seated. The downwardly moving strand of the chain carries the rings downwardly through the table recesses at the first station and thereby deposits empty molds on the tables. The empty rings then pass on down and around sprocket 27 and up through the table recesses at the sixth station where they engage and lift loaded molds from the tables and carry them to the drier. As will be seen in Fig. 2, the same mold carrier that deposits a mold on the table at the first station picks up that same mold at the last station, thereby avoiding the possibility of jamming the machine in case one of the mold carriers happens to be missing. By mounting the machines in pairs as shown, one conveyor chain serves two machines.

To prevent the mold carriers from swinging as they pass through the tables, which might cause them to strike the tables and deposit empty molds off-center in their recesses, or result in loaded molds not seating properly in the rings, guides are provided. There are two guides for each strand of the chain, one guide being for the mold carriers for one machine and the other for the carriers for the other machine. Each guide is formed from a pair of laterally spaced upright channels 41 having their flanges facing each other and receiving between them the opposite edges of the carrier brackets 32 which are thereby held steady so that rings 34 cannot swing in any direction as they pass through the table recesses. The lower ends of the guides are supported by parallel horizontal bars 42 fastened at their ends to housings 1, and the upper ends of the guides are connected to similar bars 43 fastened to top plates 44 supported above housings 1 by legs 46. To guide brackets 32 into the guides the opposite ends of the brackets are tapered and the opposite ends of the guide channels are curved outwardly, as shown in Fig. 2.

After a mold has been deposited on the table at the first station the table is indexed in the direction of the arrow in Fig. 1 to bring the mold to the second station. At either the second or third station, which are clay-receiving stations, a disc-like blank of clay is deposited on the mold, preferably by the clay-feeding apparatus shown in my copending application Serial No. 311,719, filed December 30, 1939, and in the copending joint application Serial No. 323,166, filed March 9, 1940, by William C. Denison, Jr., and myself. With such apparatus the clay is extruded from the lower end of a vertical tube 51 and discs of clay are periodically cut from the lower end of the clay column by means of a wire 52 that passes transversely therethrough, as shown in the right-hand machine in Fig. 3. There are two of these clay-feeding tubes, and consequently two clay-receiving stations, so that as soon as the clay ceases to emerge from one tube clay can be extruded from the other one while the first tube is being recharged, thereby avoiding any delay in the clay-feeding operation.

As soon as a mold has received a blank of clay either at the second or the third station, depending upon which clay tube is operating at the time, the charged or loaded mold is indexed on over to the fourth station where the blank is shaped over the mold by pressing apparatus, such as disclosed in my copending application Serial No. 306,482, filed November 28, 1939, carried by top plate 44. It will be seen in Fig. 3 that a slightly resilient mold chuck 56, which is normally below the table and axially aligned with the pressing die 55 and the mold at the fourth station, is disposed on the upper end of a vertically reciprocable post 57 that is mounted in bearing casings 58 supported by the upper and lower walls of housing 1. The outer surface of the upper bearing casing is cylindrical and telescopically receives a sleeve 59 extending downwardly from the bottom of the chuck. Each bearing casing 58 contains caged ball bearings 60 that space the post therefrom and permit it to reciprocate freely without lateral play which would soon occur if friction bearings were used. The ball bearings are rolled up and down in their casings by the post on which they likewise roll. When a mold on the table is indexed into position above the post and chuck, they then are raised into the position shown in Fig. 3 by a cam 61 (Figs. 3 and 4) mounted on a plate 62 encircling and rigidly connected to hollow shaft 17 in the sub-housing. The marginal portion of the plate is supported on rollers 63 carried in a pair of pedestal bearings 64 mounted on the bottom of the sub-housing. Resting on the cam is a roller 66 carried by post 57 at one side of its lower end.

When the post is raised by the cam, chuck 56 is moved upwardly through the table recess above it where it engages and raises the mold therefrom and presses the clay bat carried by the mold against heated die 55 which is mounted on the lower end of a vertically reciprocable rod 67. This presses the blank over the mold which shapes the lower surface of the blank while the die shapes its upper surface. Just before cam 61 starts to recede in order to return the mold to the table, rod 67 and the die are moved upwardly momentarily by a cam (not shown) which is actuated by a shaft 68 extending down through the central hollow leg 46. The lower end of this shaft is driven continuously by a chain and sprocket drive 69 from hollow shaft 17. If the clay tends to stick to the die and follow it upwardly the edge of the mold strikes against stripping members 71, depending from the bottom of a cylindrical casing 72 encircling the die, and thereby the mold is stripped from the die. The chuck starts to lower the mold before the die returns to its lower position.

The sub-housing 9 is filled with lubricating oil which, if allowed to form a film between roller 66 and the cam, would raise post 57 sufficiently to adversely affect the bat-pressing operation. To prevent this and also to compel the roller to follow down the receding cam when the machine is operating at high speed, means is provided for positively pressing the cam roller down on cam 61 at all times. This means preferably comprises a cylinder 73 encircling the post and mounted on its lower bearing 59, and a piston 74 rigidly mounted on the post within the cylinder. The upper end of the cylinder is connected by a pipe 76 to a tank (not shown), in which fluid is maintained under pressure all the time, and the lower end of the cylinder is connected by a short pipe 77 to the atmosphere. Consequently, the post is under downward pressure all of the time. When the post is raised by the cam, piston 74 forces the fluid above it back into the tank and when the cam recedes, the pressure of the fluid in the tank urges the piston down in the cylinder and thereby holds roller 66 down tight on the receding cam.

After the mold has been redeposited on the table at the fourth station it is indexed to the fifth station which is directly below the jiggering mechanism, as shown in Fig. 3. This mechanism includes one or more rotating scrapers or blades 81 into engagement with which the clay on the mold is moved by a chuck 82 and vertically reciprocable post 83 of the same general construction and mounted in the same manner as post 57 below the pressing apparatus. This second post is periodically raised by a cam 84 mounted on cam plate 62 outwardly beyond cam 61. The jiggering mechanism is shown in enlarged detail in Fig. 7 in which it will be seen that it extends vertically through top plate 44 of the machine.

According to this invention, the jigger blade or blades 81 extend downwardly from the bottom of a plate 86 fastened to the bottom of a collar 87 which in turn is rigidly mounted on the lower end of a hollow vertical shaft 88. This shaft is rotatably mounted in a sleeve 89 that is adjustable vertically in a tubular housing 91 extending through the machine's top plate 44 to which it is secured. This vertical adjustment is accomplished by a manually rotatable worm 92 that meshes with a worm ring gear 93 the inner surface of which is provided with screw threads that register with threads 94 cut in the upper portion of sleeve 89. To drive the jigger blades, shaft 88 is rotated by a step pulley 96 mounted on its upper portion and driven by a belt 97 from an electric motor 98 mounted on top of plate 44.

While the ware is being jiggered it is sprayed with water from one or more nozzles 101 supported by collar 87 and projecting down through notches in plate 86. Water is supplied to the nozzles by hoses 102 communicating with the interior of hollow shaft 88 into the upper end of which water is introduced through radial passages 103 that open into the lower half of a cylinder 104 in which the upper end of the shaft is journaled. Water is supplied to the lower half of this cylinder from a tube 106 that extends down through a hollow post 107, mounted on top of plate 44, and out of the machine to a suitable source of supply. Post 107 has an arm 108 at its upper end provided at its outer end with a vertical slot in which is slidably mounted a key 110 fastened to cylinder 104 so that the latter can move up and down without rotating.

Air is supplied to the nozzles, for atomizing the water, by means of hoses 112 communicating with the lower end of a pipe 113 disposed in the axial bore of hollow shaft 88 and spaced from the wall thereof. The upper end of this pipe opens into a plug 114 at the top of the shaft, and the plug is provided with radial passages 116 that open into the upper half of cylinder 104 which is sealed from the lower half. Air is supplied to this upper half of the cylinder by a tube 117 that also extends down through hollow post 107 and into housing 1 where compressed air is admitted to the tube at predetermined intervals by an adjustable control 111 (Figs. 1 and 3) driven by chain and sprocket drive 69. The control is preferably of the type shown in my copending application Serial No. 307,787, filed December 6, 1939.

To confine the water spray and the clay scrapings from the ware being jiggered, the lower end of the jiggering tool is enclosed by a cylindrical casing 118 suspended from plate 44. The opening at the bottom of the casing through which the molds and ware are elevated by chuck 82 is encircled by an upstanding flange 119 that is spaced from the wall of the casing to form an annular trough around the opening. At one point the outer wall and bottom of this channel are provided with an opening 121 from which a chute 122 extends downwardly and outwardly to a suitable waste receptacle (not shown). The clay scrapings that collect in this annular trough are scraped around to opening 121 and the chute by a rotating scraper blade 123 mounted on the lower end of a rod 124 extending downwardly from a ring 126 carried by a ring gear 127. This gear is rotatably supported by an annular retaining ring 128 and is driven by a pinion 129 on the lower end of a shaft 131 that extends upwardly through plate 44 to a small electric motor 132.

As soon as the ware has been jiggered and returned to the table the supporting mold is indexed to the last station and lifted from the table by an upwardly traveling conveyor ring 34 which carries the mold and ware through the drier and later returns the empty mold to the table at the first station. It will thus be seen that this apparatus is entirely automatic and that every operation is performed by mechanical means, from the time that the clay is charged into the clay-feeding tubes until the dried ware is removed from the molds after they leave the drier. The apparatus is so compact that it requires but little floor space, and its construction is so simple that there is little to get out of order. Due to the fact that most of the moving parts rotate or travel in a cycle in the same direction, there is no appreciable noise or vibration. The different elements of the apparatus can be adjusted so finely that very high grade dinnerware can be manufactured consistently. Finally, the speed at which the machines operate helps to materially decrease the cost of manufacture. For example, they have turned out twenty-four pieces of ware per minute per single machine.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. Apparatus for manufacturing dinnerware and the like, comprising a horizontal support provided with spaced recesses therethrough for receiving molds, means for indexing said recesses from station to station, means for forming ware on the molds at some of said stations, a plurality of mold-carrying members, and means for moving said members downwardly through successive recesses at one of said stations and upwardly through successive recesses at another of said stations, whereby molds are deposited on said support by said downwardly moving members and removed from the support by said upwardly moving members.

2. Apparatus for manufacturing dinnerware and the like, comprising a horizontal support provided with spaced recesses therethrough for receiving molds, means for indexing said recesses from station to station, means for forming ware on the molds at some of said stations, a plurality of mold-carrying members, and an endless continuously traveling chain carrying said members downwardly through successive recesses at one of said stations and upwardly through successive recesses at another of said stations, whereby molds are deposited on said support by said downwardly moving members and removed from the support by said upwardly moving members.

3. Apparatus for manufacturing dinnerware and the like, comprising a horizontal table provided with circumferentially spaced recesses therethrough for receiving molds, means for rotating said table recesses from station to station, means for forming ware on the molds at some of said stations, a sprocket journaled on a horizontal axis below the table at one side thereof, an endless chain trained around the sprocket and having its two strands extending upwardly therefrom adjacent two of said stations, laterally projecting arms pivotally connected to said chain at spaced intervals, the free ends of the arms being formed for passing vertically through said recesses and for carrying molds, and means operatively connecting said table-rotating means to said sprocket.

4. Apparatus for manufacturing dinnerware and the like, comprising a horizontal support provided with spaced recesses therethrough for receiving molds, means for indexing said recesses from station to station, means for forming ware on the molds at some of said stations, an endless traveling chain passing downwardly adjacent one of said stations and upwardly adjacent another station, a plurality of mold-carrying members pivotally connected to said chain at spaced intervals and projecting laterally therefrom, the free ends of said members being adapted to be carried by the chain vertically through said recesses at said two stations, and guiding means mounted beside said strands adjacent the table for guiding said members through said recesses without swinging.

5. Apparatus for manufacturing dinnerware and the like, comprising a horizontal support provided with spaced recesses therethrough for receiving molds, means for indexing said recesses from station to station, means for forming ware on the molds at some of said stations, an endless traveling chain passing downwardly adjacent one of said stations and upwardly beside another station, a plurality of brackets pivotally suspended from their upper ends from the side of said chain at spaced intervals, a laterally projecting mold-carrying member connected to each of said brackets and adapted to be carried by the chain vertically through said recesses at said two stations, and a pair of horizontally spaced vertical rails rigidly mounted beside each of said strands and adapted to receive said vertically moving brackets between them to hold them against swinging while said mold-carrying members are passing through said recesses.

6. Apparatus for manufacturing dinnerware and the like, comprising a pair of laterally spaced horizontal tables provided with circumferentially spaced recesses therethrough for receiving molds, a common horizontal drive shaft mounted below the tables for rotating them to index the recesses from station to station, means for forming ware on the molds at some of said stations, a sprocket rotatably mounted between the tables, an endless chain trained around the sprocket and having its two strands extending upwardly between the tables, arms pivotally connected to said chain at spaced intervals and projecting laterally from the opposite sides thereof toward the tables, the free ends of the arms being formed for passing vertically through said recesses at predetermined points and for carrying molds to and from those recesses.

7. Apparatus for manufacturing dinnerware and the like, comprising a pair of laterally spaced horizontal tables provided with circumferentially spaced recesses therethrough for receiving molds, means for indexing said recesses from station to station, means for forming ware on said molds at some of said stations, and a single mold conveyor common to both tables and formed for depositing empty molds in said recesses at a predetermined station and removing loaded molds from said recesses at another predetermined station.

8. Apparatus for manufacturing dinnerware and the like, comprising a support for carrying molds through a fabricating zone, means for forming ware on said molds in said zone, and a mold conveyor formed for depositing empty molds directly on said support and removing loaded molds directly therefrom and carrying them away.

9. Apparatus for manufacturing dinnerware and the like, comprising a rotatable support for carrying molds through a fabricating zone, means for forming ware on said molds in said zone, and a traveling endless mold conveyor formed for depositing empty molds directly on said support and removing loaded molds directly therefrom.

10. Apparatus for manufacturing dinnerware and the like, comprising a support for molds, means for forming ware on said molds, and a traveling endless mold conveyor provided with mold-carrying means for depositing empty molds directly on said support and removing loaded molds directly therefrom, each mold-carrying means removing the same mold from said support that it previously deposited thereon.

11. Apparatus for manufacturing dinnerware and the like, comprising a rotatable vertical shaft, a horizontal table rigidly mounted on the upper end of the shaft and provided with circumferentially spaced recesses for receiving molds, a Geneva spider rigidly mounted on the shaft, a hollow shaft journaled on said rotatable shaft, a driving gear rigidly mounted on said hollow shaft, means for rotating said driving gear, means periodically operatively connecting the driving gear with said spider for indexing the table recesses from station to station, a vertically slidable post adapted to lift a mold from one of said table recesses positioned above the post, a cam rigidly mounted on said hollow shaft for raising said post when one of said recesses is indexed into position above it, means above said post for performing an operation on plastic material carried by the raised mold, a horizontal shaft rotatably mounted below said table and projecting laterally from under it, a sprocket rigidly mounted on the projecting portion of said horizontal shaft, a gear mounted on the inner end of that shaft, a pinion rigidly mounted on said hollow shaft and meshing with said last mentioned gear for rotating the sprocket, an endless conveyor chain carried by the sprocket, and a plurality of mold-carrying members projecting laterally from the chain and adapted to pass vertically through a pair of adjacent recesses in the table to remove charged molds therefrom and deposit emptied molds thereon.

12. Apparatus for manufacturing dinnerware and the like, comprising an intermittently moving support for molds for carrying them through a fabricating zone, means for forming ware on said molds in said fabricating zone, and a continuously traveling endless mold conveyor formed for depositing empty molds directly upon said support and removing loaded molds directly therefrom while said support is at rest.

13. The combination of a horizontal support provided along its edge with spaced recesses therethrough, means for moving said support to index said recesses from station to station, a plurality of members for supporting articles that are wider than said recesses, and an endless traveling chain for carrying said members downwardly through said recesses at one of said stations and upwardly through the recesses at another of said stations, whereby said articles are deposited on said support by said members as they move downwardly through the recesses and are removed from the support by said members as they move upwardly through the recesses.

14. The combination of a table provided with circumferentially spaced recesses therethrough, means for rotating said table to index its recesses from station to station, a plurality of members for supporting articles that are wider than said recesses, and an endless traveling chain for carrying said members downwardly through successive recesses at one of said stations and upwardly through successive recesses at another of said stations, whereby said articles are deposited on said table by said downwardly moving members and removed from the table by the upwardly moving members.

15. The combination of a pair of laterally spaced tables provided with circumferentially spaced recesses therethrough, means for rotating the tables in opposite directions to index said recesses from station to station, a sprocket rotatably mounted between the tables, an endless chain trained around the sprocket and extending upwardly from opposite sides thereof, and arms connected to said chain at spaced intervals and projecting from opposite sides thereof toward the tables, the free ends of the arms being formed for carrying articles that are wider than said recesses and for passing vertically through said recesses whereby said articles are deposited on said tables by said downwardly moving arms and lifted from the table by the upwardly moving arms.

16. Apparatus for manufacturing dinnerware and the like, comprising a unitary support for carrying molds through a fabricating zone, means for forming ware on said molds in said zone, and a mold conveyor formed for depositing empty molds directly on and removing loaded molds directly from said support.

17. Apparatus for manufacturing dinnerware and the like, comprising an intermittently moving unitary support for molds for carrying them through a fabricating zone, means for forming ware on said molds in said fabricating zone, and a continuously traveling endless mold conveyor formed for depositing empty molds directly on and removing loaded molds directly from said support.

18. Apparatus for manufacturing dinnerware and the like, comprising a support for carrying molds through a fabricating zone, means for forming ware on said molds in said zone, and a mold conveyor formed for setting empty molds directly upon said support and for lifting loaded molds off the support and carrying them away.

WALTER H. EMERSON.